(12) United States Patent
Shi et al.

(10) Patent No.: US 7,431,612 B2
(45) Date of Patent: Oct. 7, 2008

(54) FIXING MECHANISM FOR COMPONENT

(75) Inventors: Zheng Shi, Shenzhen (CN); Chien-Li Tsai, Tu-Cheng (TW)

(73) Assignees: Hong Fu Jin Precision (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 68 days.

(21) Appl. No.: 11/309,194

(22) Filed: Jul. 12, 2006

(65) Prior Publication Data

US 2007/0072469 A1 Mar. 29, 2007

(30) Foreign Application Priority Data

Jul. 15, 2005 (CN) .................... 2005 2 0061658 U

(51) Int. Cl.
*H01R 13/60* (2006.01)
*H01R 13/66* (2006.01)
(52) U.S. Cl. ...................................... 439/567; 439/188
(58) Field of Classification Search ................. 439/135, 439/136, 188, 567; 429/97, 100
See application file for complete search history.

(56) References Cited

U.S. PATENT DOCUMENTS

| 7,192,291 | B2 * | 3/2007 | Shi et al. ..................... 439/135 |
| 7,220,142 | B2 * | 5/2007 | Liang .......................... 439/326 |
| 7,265,987 | B2 * | 9/2007 | Zhang et al. ................. 361/727 |
| 2006/0245160 | A1 * | 11/2006 | Zhang et al. ................. 361/685 |
| 2006/0267462 | A1 * | 11/2006 | Peng et al. ............... 312/223.2 |
| 2006/0279925 | A1 * | 12/2006 | Shi et al. ..................... 361/685 |
| 2007/0053148 | A1 * | 3/2007 | Shi et al. ..................... 361/684 |
| 2007/0072469 | A1 * | 3/2007 | Shi et al. ..................... 439/260 |

FOREIGN PATENT DOCUMENTS

TW 221956 10/2004

* cited by examiner

*Primary Examiner*—James Harvey
(74) *Attorney, Agent, or Firm*—Wei Te Chung

(57) ABSTRACT

A fixing mechanism includes a receptacle for receiving a component. A pair of spaced rails is formed in the receptacle and defining a slideway therebetween. A latch member is movable along the slideway. A resilient member is installed adjacent the slideway and engagable with the latch member to urge the latch member forward for fixing the component and to assist in urging the latch member backward when the latch member is operated to unfix the component.

16 Claims, 3 Drawing Sheets

FIXING MECHANISM FOR COMPONENT

FIELD OF THE INVENTION

The present invention relates to a fixing mechanism, and more particularly to a fixing mechanism for fixing a component in an electronic apparatus.

DESCRIPTION OF PRIOR ART

A portable electronic apparatus such as a notebook computer or a laptop computer, usually includes optional components, such as hard disk drives, compact disc read-only memory (CD-ROM) drives, digital video disc (DVD) drives, floppy disk drives, and the like. These storage devices are typically added to increase the functionality of the electronic apparatus as desired by a user.

Components are typically attached in the electronic apparatus by screws. However, attachment with screws is unduly complicated and time consuming. In addition, a tool is usually required for installation and removal of the screws.

What is desired, therefore, is an electronic apparatus having a component fixing mechanism which facilitates removal and attachment of a component thereof.

SUMMARY OF THE INVENTION

An exemplary fixing mechanism is provided to fix a component. The fixing mechanism includes a receptacle for receiving the component. A pair of spaced rails is installable in the receptacle and defines a slideway therebetween. A latch member is movable along the slideway. A resilient member is installable adjacent the slideway and engagable with the latch member to urge the latch member forward for fixing the component and also to assists in urging the latch member backward when the latch member is operated to unfix the component.

Other advantages and novel features will become more apparent from the following detailed description of a preferred embodiment when taken in conjunction with the accompanying drawings, in which:

DETAILED DESCRIPTION OF THE INVENTION

Figure 1:
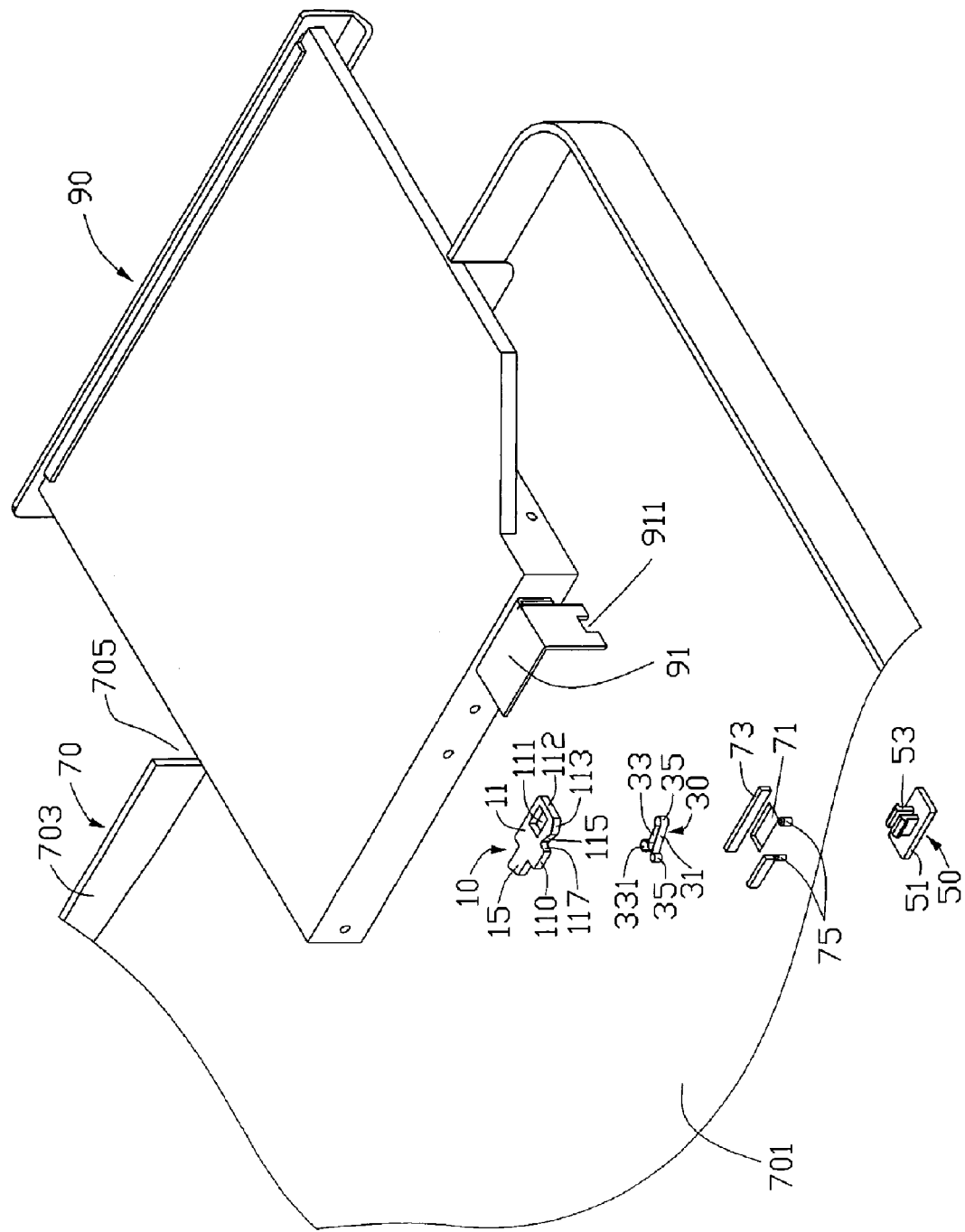
FIG. 1 is an exploded, isometric view of a fixing mechanism in accordance with a preferred embodiment of the present invention together with a component to be fixed in place.
Figure 2:
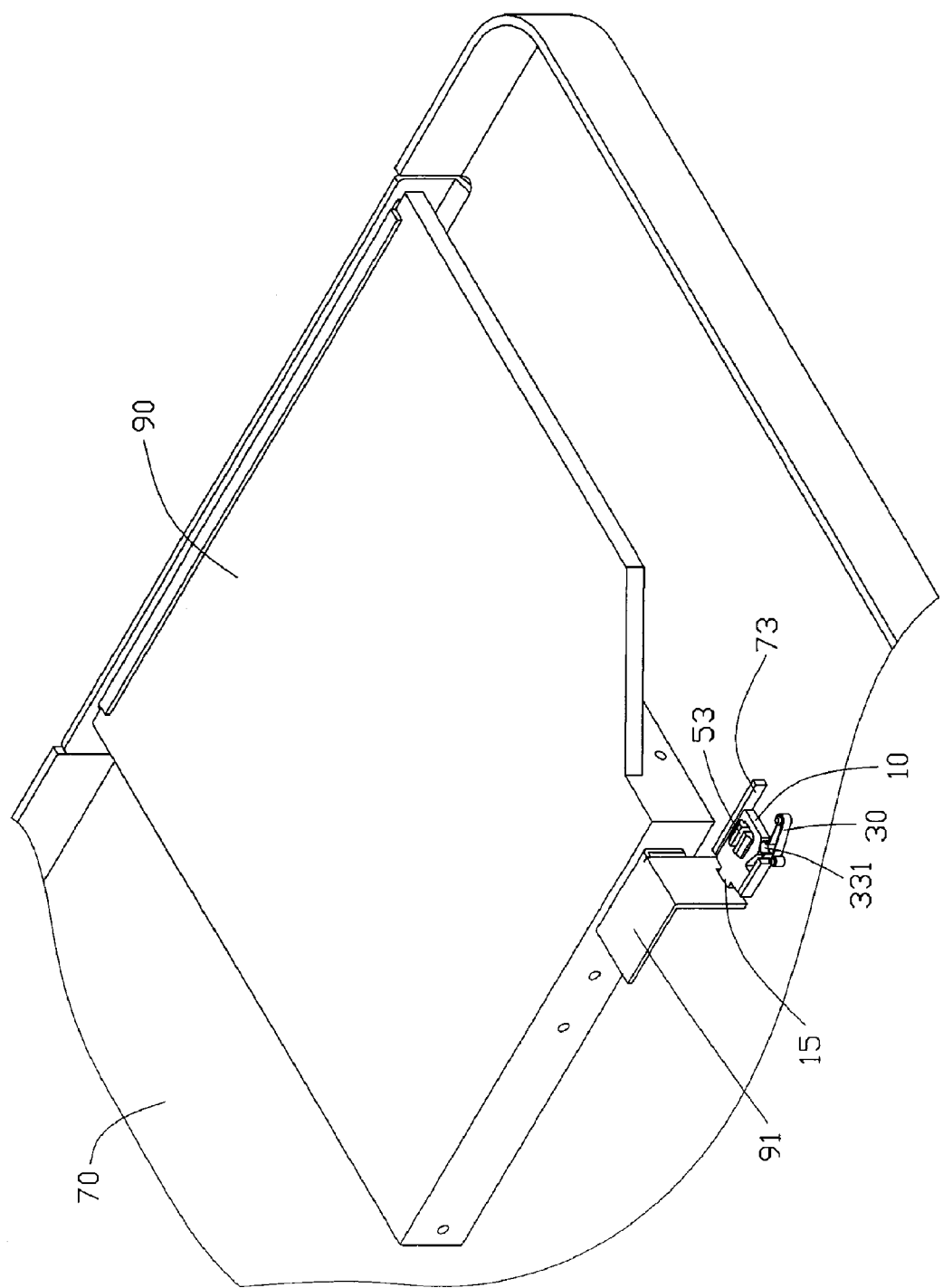
FIG. 2 is an assembled view of FIG. 1, showing the component in a fixed position.
Figure 3:
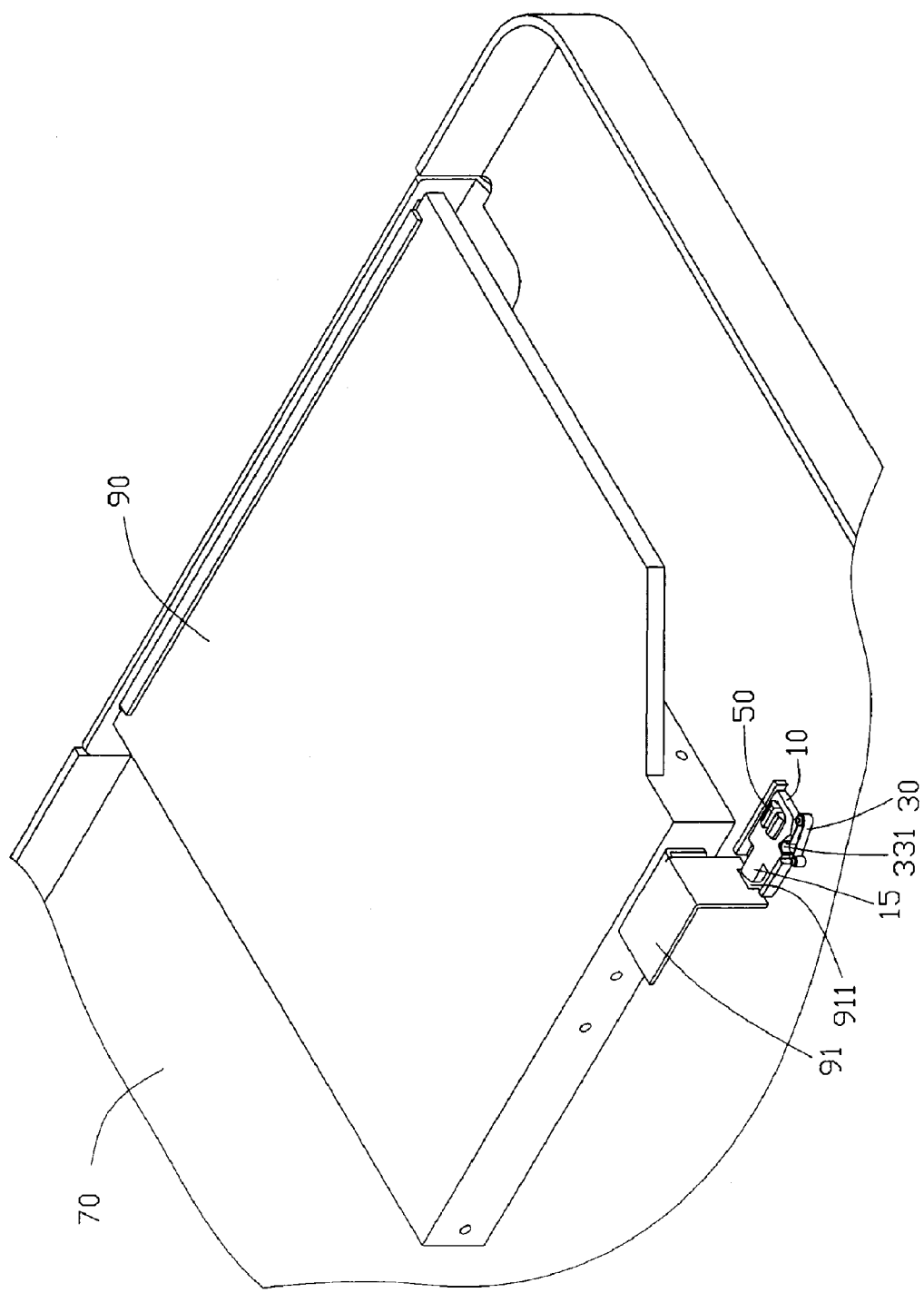
FIG. 3 is similar to FIG. 2, but showing the component in an unfixed position.

Referring to FIGS. 1 to 3, a fixing mechanism of an electronic device like a laptop in accordance with a preferred embodiment of the present invention is provided to attach a component 90 to a receptacle 70. The fixing mechanism includes a latch member 10, a resilient member 30, and a switch 50.

The receptacle 70 includes a first wall 701 and a second wall 703 extending up from an edge of the first wall 701. An opening 705 is defined in the second wall 703 allowing extension of the component 90 therethrough.

A pair of parallel rails 73 is arranged on the first wall 701 generally parallel to the second wall 703. Both rails 73 cooperatively define a slideway therebetween. The rails 73 include one short rail and one long rail. The long rail 73 is proximal to the second wall 703. Two spaced posts 75 protrude up from the first wall 701. One post 75 is arranged adjacent the short rail 73. A switch hole 71 is defined in the first wall 701 parallel to the long rail 73 and generally between the long rail 73 and the posts 75.

The latch member 10 includes a body 11 and a protrusion 15 extending out from an end of the body 11. The body 11 defines a lateral surface 110 adjacent the protrusion 15, and an end surface 112 at an opposite end thereof. An aperture 111 is defined in the body 11. The body 11 defines a first slanting surface 113, a second slanting surface 115, and a vertical surface 117 in that order by cutting out a portion of a side where the lateral surface 110 is defined. The first slanting surface 113 communicates with the end surface 112. The first and second slanting surfaces 113, 115 share a common edge and cooperatively define a generally V-shaped portion, and an acme of the V-shaped portion protrudes outward. The vertical surface 117 adjoins the lateral surface 110 and the second slanting surface 113.

The resilient member 30 is a generally U-shaped plate. The resilient member 30 includes a base portion 31 and an elastic portion 33. The base portion 31 includes two curved sections 35 formed by bending opposite ends thereof in opposite directions, for receiving the posts 75 of the receptacle 70 respectively. The elastic portion 33 integrally connects with one proximal curved section 35 and extends generally parallel to the base portion 31. The elastic portion 33 includes an arcuate section 331 at a free end thereof, corresponding to the latch member 10.

The switch 50 includes a base 51, and two spaced resilient hooks 53 extending up from the base 51 for engaging in the aperture 111 of the latch member 10.

The component 90 can be an electronic device, for example an optical drive or a hard disc drive. A retainer 91 is detachably attached to a rear end of the component 90, corresponding to the latch member 10. The retainer 91 includes a vertical tab defining a cutout 911 at a lower end thereof.

Referring to FIGS. 2 and 3, in assembly and use, the latch member 10 is placed generally between the rails 73, 75, with the aperture 111 thereof in alignment with the switch hole 71 of the first wall 701 of the receptacle 70. The resilient member 30 is placed on the first wall 701, with the posts 75 fitting in the curved portions 35 of the resilient member 30 respectively. The hooks 53 of the switch 50 extend up from under the first wall 701 through the switch hole 71 of the first wall 701 and the aperture 111 of the body 11 in sequence to catch at the latch member 10. The base 51 of the switch 50 engages with a lower surface of the first wall 701 and is accessible from outside the receptacle 70. The switch hole 71 of the first wall 701 allows the hooks 75 to move therein in a front-to-back direction.

In assembling the component 90 to the receptacle 70, the component 90 is pushed into the receptacle 70 via the opening 705. The cutout 911 of the retainer 91 is aligned with the protrusion 15 of the latch member 10. The switch 50 is activated to move the latch member 10 toward the retainer 91. The second slanting surface 115 of the latch member 10 moves along and urges against the arcuate section 331 of the elastic portion 33 toward the base portion 31. The elastic portion 33 is thus compressed. When the second slanting surface 115 rides over the arcuate section 331 of the elastic portion 33, the first slanting surface 113 adjoining the second slanting surface 115 of the latch member 10 engages with the arcuate section 331 of the elastic portion 33 due to elastic restoration of the elastic portion 33. The restoration of the elastic portion 33 facilitates moving the latch member 10 on by urging against the first slanting surface 113 of the latch member 10. The protrusion 15 of the latch member 10 is inserted through the cutout 911 of the retainer 91 thereby attaching the component 90 to the receptacle 70.

Referring particularly to FIG. 2, the component 90 is fixed in the receptacle 70. The protrusion 15 of the latch member 10 is extended out from between the rails 73 and through the cutout 911 of the retainer 91. The arcuate section 331 of the resilient member 30 abuts against the first slanting surface 113 of the latch member 10 to prevent the protrusion 15 of the latch member 10 from disengaging from the retainer 91.

Referring particularly to FIG. 3, to detach the component 90 from the receptacle 70, the switch 50 is slid to move the latch member 10 away from the retainer 91 along the slideway defined by the rails 73. The first slanting surface 113 of the latch member 10 moves along and urges the arcuate section 331 of the elastic portion 33 toward the base portion 31. The elastic portion 33 is thus compressed. When the first slanting surface 113 rides over the arcuate section 331 of the elastic portion 33, the second slanting surface 115 adjoining the first slanting surface 113 of the latch member 10 engages with the arcuate section 331 of the elastic portion 33 due to elastic restoration of the elastic portion 33. The restoration of the elastic portion 33 facilitates moving the latch member 10 on by urging against the second slanting surface 115 of the latch member 10. The switch 10 is slid along until the vertical surface 117 of the latch member 10 abuts against the arcuate section 331 of the elastic portion 33, and the protrusion 15 of the latch member 10 is fully withdrawn from the cutout 911 of the retainer 91. The component 90 is then ready to be detached from the receptacle 70 via the opening 705.

It is believed that the present embodiment and its advantages will be understood from the foregoing description, and it will be apparent that various changes may be made thereto without departing from the spirit and scope of the invention or sacrificing all of its material advantages, the embodiment and examples hereinbefore described merely being one preferred or exemplary embodiment with exemplary detail.

What is claimed is:

1. A fixing mechanism for a component, the fixing mechanism comprising:
    a receptacle for receiving the component;
    a pair of spaced rails installable in the receptacle and defining a slideway therebetween;
    a latch member movable along the slideway for detachably fixing the component; and
    a resilient member installable adjacent the slideway and engagable with the latch member to urge the latch member forward for fixing the component and to assist in urging the latch member backward when the latch member is operated to unfix the component.

2. The fixing mechanism as claimed in claim 1, wherein the resilient member comprises an elastic portion having an arcuate section, the latch member comprises a body defining first and second slanting surfaces at a side portion thereof engagable with the arcuate section of the elastic portion of the resilient member.

3. The fixing mechanism as claimed in claim 2, wherein the first and second slanting surfaces cooperatively define a generally V-shaped portion, and an acme of the V-shaped portion protrudes outward.

4. The fixing mechanism as claimed in claim 2, wherein the resilient member further comprises a base portion attached to the receptacle, the base portion and the elastic portion cooperatively define a U-shaped construction.

5. The fixing mechanism as claimed in claim 2, further comprising a switch having a pair of hooks, wherein the body of the latch member defines an aperture allowing extension of the hooks to engage the body, and the switch is operated to move the latch member.

6. The fixing mechanism as claimed in claim 3, wherein the body of the latch member further defines a vertical surface adjoining the second slanting surface.

7. An assembly comprising:
    a receptacle comprising a first wall;
    a component placeable on the first wall;
    a latch member movably attached to the first wall to detachably hold the component in place, the latch member comprising a body defining first and second slanting surfaces at a side portion thereof, the first and second slanting surfaces extending away from each other; and
    a resilient member installable on the first wall and engagable with the first and second slanting surfaces of the latch member respectively to urge the latch member forward to engage the component and to assist in urging the latch member backward when the latch member is operated to disengage from the component.

8. The assembly as claimed in claim 7, wherein the first and second slanting surfaces of the latch member share a common edge.

9. The assembly as claimed in claim 8, wherein the resilient member comprises an elastic portion having an arcuate section engagable with the first and second slanting surfaces of the latch member.

10. The assembly as claimed in claim 9, wherein the resilient member further comprises a base portion, the elastic portion integrally connects with the base portion and extends generally parallel to the base portion.

11. The assembly as claimed in claim 10, wherein the base portion comprises two curved sections formed by bending opposite ends thereof in opposite directions, two posts are arranged on the first wall of the receptacle and engaged with the curved sections of the base portion respectively to attach the resilient member to the first wall.

12. The assembly as claimed in claim 7, further comprising a retainer attachable to the component, the retainer defining a cutout, wherein the latch member comprises a protrusion engagable in the cutout to fix the component.

13. The assembly as claimed in claim 7, wherein a switch hole is defined in the first wall of the receptacle, a switch is provided to connect with the latch member, and the switch is accessible from outside the receptacle for operating the latch member.

14. An electronic device comprising:
    a receptacle of said electronic device defining a space therein;
    a component of said electronic device removably installable in said space of said receptacle to function therein for said electronic device;
    a latch member movably attachable in said space of said receptacle beside said installed component in said space, said latch member movable between a first position thereof where said latch member engages with said installed component to retain said installed component in said space, and a second position thereof where said latch member disengages from said installed component to release said installed component free to be removed out of said space; and
    a resilient member movably installable in said space beside said latch member to engage therewith, engagement of said resilient member with said latch member retaining said latch member in said first position thereof and said second position thereof alternatively.

15. The electronic device as claimed in claim 14, wherein said latch member comprises a first slanting surface and a second slanting surface, said resilient member engages with said first slanting surface to retain said latch member in said first position thereof, and engages with said second slanting surface to retain said latch member in said second position thereof.

16. The electronic device as claimed in claim 15, wherein said first slanting surface and said second slanting surface face oppositely to engage with said resilient member.

* * * * *